United States Patent [19]

Sone

[11] Patent Number: 5,768,396
[45] Date of Patent: Jun. 16, 1998

[54] ONLINE KARAOKE SYSTEM WITH FLYING START PERFORMANCE

[75] Inventor: Takurou Sone, Hamamatsu, Japan

[73] Assignee: Yamaha Corporation, Hamamatsu, Japan

[21] Appl. No.: 667,491

[22] Filed: Jun. 24, 1996

Related U.S. Application Data

[63] Continuation of Ser. No. 230,347, Apr. 20, 1994, abandoned.

[30] Foreign Application Priority Data

Apr. 21, 1993 [JP] Japan .................. 5-117873

[51] Int. Cl.$^6$ .................................. H03G 3/00
[52] U.S. Cl. .................. 381/61; 381/63; 381/118; 434/307 A
[58] Field of Search ................. 381/118, 61, 63; 84/630, 634, 662, 666, 701; 434/307 A

[56] References Cited

U.S. PATENT DOCUMENTS

| | | | |
|---|---|---|---|
| 4,327,410 | 4/1982 | Patel | 364/200 |
| 4,845,712 | 7/1989 | Sanner | 371/25 |
| 5,036,488 | 7/1991 | Motarjemi | 365/52 |
| 5,049,814 | 9/1991 | Walker, III | 3242/158 R |
| 5,073,873 | 12/1991 | Nogami | 365/189.05 |
| 5,126,975 | 6/1992 | Handy | 365/230.01 |
| 5,150,113 | 9/1992 | Blüthgen | 340/825.3 |
| 5,224,070 | 6/1993 | Fandrich et al. | 365/185 |
| 5,243,575 | 9/1993 | Sambandan | 365/233.5 |
| 5,294,745 | 3/1994 | Yamauchi et al. | 84/601 |
| 5,307,470 | 4/1994 | Kataoka | 395/425 |
| 5,333,300 | 7/1994 | Fandrich | 395/550 |
| 5,336,844 | 8/1994 | Yamauchi et al. | 84/602 |
| 5,355,464 | 10/1994 | Gossage | 395/425 |
| 5,357,505 | 10/1994 | Tsumura et al. | 370/60 |

FOREIGN PATENT DOCUMENTS

| | | | |
|---|---|---|---|
| 531670 | 3/1993 | European Pat. Off. | G10H 1/00 |
| 0531670 | 3/1993 | WIPO | G10H 1/00 |

OTHER PUBLICATIONS

International Facsimile Communications over Packet Switched Network; Teramura; 1983; pp. 239–247.
Experimental Facsimile Communication System on Packet Switched Data Network; 1981; pp. 1942–1951.
Fundamentals of Circuits, Electronics, and Signal Analysis; Kendall Su.

*Primary Examiner*—Thomas D. Lee
*Assistant Examiner*—Jerome Grant, II
*Attorney, Agent, or Firm*—Pillsbury Madison & Sutro LLP

[57] ABSTRACT

A karaoke system of an online type is comprised of a karaoke station for sounding a karaoke performance according to a performance data, and a host station for supplying the performance data to the karaoke station in response to a request. The host station has a transmitter unit for time-sequentially dividing the performance data into a plurality of parts, and for successively transmitting each part arranged according to progression of the karaoke performance in response to the request. The karaoke station has a receiver unit operative when a preceding one of the transmitted parts is received for commencing the karaoke performance based on the received preceding part while admitting a succeeding one of the transmitted parts in parallel to sounding of the karaoke performance to thereby maintain continuous progression of the sounding of the karaoke performance.

4 Claims, 6 Drawing Sheets

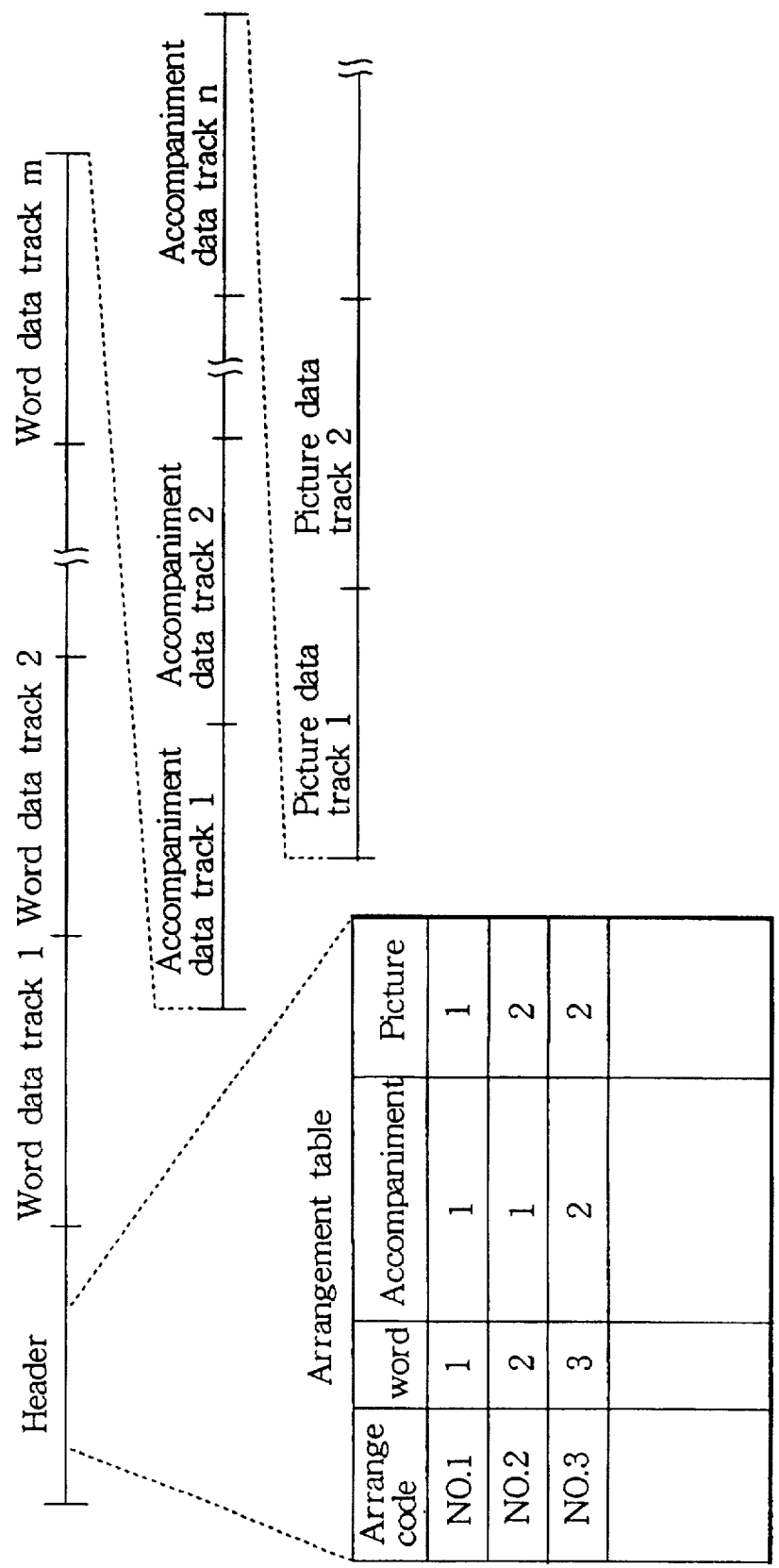

5,768,396

1

ONLINE KARAOKE SYSTEM WITH FLYING START PERFORMANCE

This is a continuation of application Ser. No. 08/230,347 filed Apr. 20, 1994, now abandoned.

BACKGROUND OF THE INVENTION

The present invention relates to a karaoke system of an online type comprised of a peripheral karaoke station having a sound source for sounding a karaoke performance according to a performance data and a central host station for communicably supplying the performance data to the karaoke station in response to a request therefrom. More specifically, the invention relates to a transfer format of the karaoke performance data, and relates to an arrangement of the karaoke performance data.

A karaoke apparatus is constructed such as to produce an instrumental accompaniment part of a requested song, which is concurrently mixed with a live vocal part of the same song picked up by a microphone. The karaoke apparatus becomes popular, and is installed not only in a bar and a club, but also in a specialized rental room called "karaoke box" and a vehicle such as a tourist bus. The conventional karaoke apparatus is normally an offline type composed of a closed record unit for recording analog or digital audio information and associated video information of karaoke songs, an audio unit for reproducing the karaoke song and mixing a singing voice therewith, a video unit for displaying background pictures and word characters along with the reproduction of the karaoke song, and a control unit for controlling these of the record, audio and video units. Recently, another karaoke apparatus of an online type is developed such as to receive a karaoke performance data (song data) prescriptive of the karaoke song from a host station through a telecommunication line. Generally, the online karaoke apparatus has a tone generator for synthesizing musical tones according to the song data prescriptive of the karaoke song.

The offline karaoke apparatus has the built-in record unit which is a closed or isolated data source, hence the offline karaoke apparatus cannot respond to a request for a nonentry karaoke song which is not stored in the record unit. On the other hand, the online karaoke apparatus can access a database of the host station to freely retrieve therefrom a desired song data in response to a singer's request. An ultimate type of the online karaoke apparatus is solely dependent on the data telecommunication such that all the requested song data are supplied from the host station. In order to save data communication cost and time required for repeated access to the host station upon every request, a semi-self-support type of the online karaoke apparatus has a storage defining an open data source for stocking the song data supplied from the host station for re-use.

The ultimate type of the online karaoke apparatus accesses the host station to take therefrom a karaoke performance data of one song immediately after a player's request. The same is true with respect to the semi-self support type of the online karaoke apparatus when a requested song is not reserved in the data storage. In such a case, the player or an operator of the karaoke apparatus waits for prompt sounding of the requested sol. However, the online karaoke apparatus requires a considerable communication time to finish receipt of the performance data even through a fast telecommunication network such as Integrated Services Digital Network (ISDN), thereby delaying a start of the karaoke performance. The communication time includes a forward transmission of the song request from the karaoke apparatus (hereinafter, occasionally referred to as "karaoke station") to the host station, a search of the performance data of the requested song in the host station, and a reverse transmission of the searched performance data from the host station to the karaoke station. Such a delay of the start of the karaoke performance may cause a drawback in a practical sense as compared to the offline karaoke apparatus which can instantly commence the karaoke performance in response to the request. The data communication duration depends on contents and formats of the karaoke performance data. A sophisticated karaoke apparatus adopts the performance data having a composite format containing not only basic accompaniment information effective to synthesize an instrumental accompaniment, but also additional information of various events or representations involved in the karaoke performance such as lyric display, background picture display, application of sound effects and illumination control. Such a vast volume of the performance data is transmitted in a serial format composed of a sequence of data tracks corresponding to the various events. Thus, the karaoke station cannot commence the karaoke performance until the last track of the serial train is received.

Aside from above, occasionally, one karaoke song may have different versions such as a pair of Japanese lyric version and foreign language lyric version, or a pair of original version and parody version. Conventionally, a complete performance data is prepared for each of the different versions of the same song even though the respective versions have a common major part of various events. Thus, the conventional karaoke apparatus suffers from redundant data communication for responding to a request of a karaoke song version.

SUMMARY OF THE INVENTION

In view of the above noted drawbacks of the prior art, a general object of the present invention is to realize efficient karaoke performance data transfer of the online karaoke system between the host station and the karaoke station. A first specific object of the invention is to shorten the data communication time to enable quick start of the karaoke performance in response to a song request. A second specific object of the invention is to reduce a data transfer volume to save the data communication cost and the data storage capacity.

In a first aspect of the inventions a karaoke system of an online type comprises a karaoke station for sounding a karaoke performance according to a performance data, and a host station for supplying the performance data to the karaoke station in response to a request. The host station has transmitter means for time-sequentially dividing the performance data into a plurality of parts, and for successively transmitting each part arranged according to progression of the karaoke performance in response to the request. The karaoke station has receiver means operative when a preceding one of the transmitted parts is received for commencing the karaoke performance based on the received preceding part while admitting a succeeding one of the transmitted parts in parallel to sounding of the karaoke performance to thereby maintain continuous progression of the sounding of the karaoke performance.

According to the first aspect of the invention, the karaoke performance data is stored in the host station in the form of a plurality of data tracks corresponding to different kinds of events involved in the karaoke performance. Each data track contains a train of time-sequentially arranged data sections. Coincident ones of the data sections are collected from the respective data tracks to form each divided part of the performance data. Each part is successively transmitted to the karaoke station. Upon receipt of the first parts the karaoke station c an commence the karaoke performance in flying start mode because the received first part contains all the concurrent events involved in the karaoke performance. In parallel to the reproduction of the karaoke performance, a second and further part is received to succeed the reproduction of the first part to thereby continue the performance without interruption. Moreover, the data transfer of the second and further part can be canceled immediately when the received first part is found an inadvertently requested song.

In a second aspect of the invention, a karaoke system responsive to an arrangement command for sounding a desired version of a karaoke performance of a requested song based on a performance data, comprises supply means for supplying the performance data containing variation components representative of variations of the karaoke performance involved in the same requested song, arrangement means responsive to the arrangement command for selecting particular ones of the variation components from the supplied performance data to arrange a desired version of the karaoke performance, and sound means for processing the selected variation components of the performance data to sound the arranged version of the karaoke performance.

According to the second aspect of the invention, the performance data has a complex format containing variation components and common components assigned to separate data tracks. A particular variation component is selected together with the common components in response to the arrangement command to form a desired version of the same song. Such a complex format can efficiently save the total data volume since the common data tracks can be used for different arrangements, thereby saving the data communication time and the data storage capacity.

BRIEF DESCRIPTION OF THE DRAWINGS

FIG. 6 is a schematic diagram showing another song data format.

DETAILED DESCRIPTION OF THE INVENTION

Figure 1:
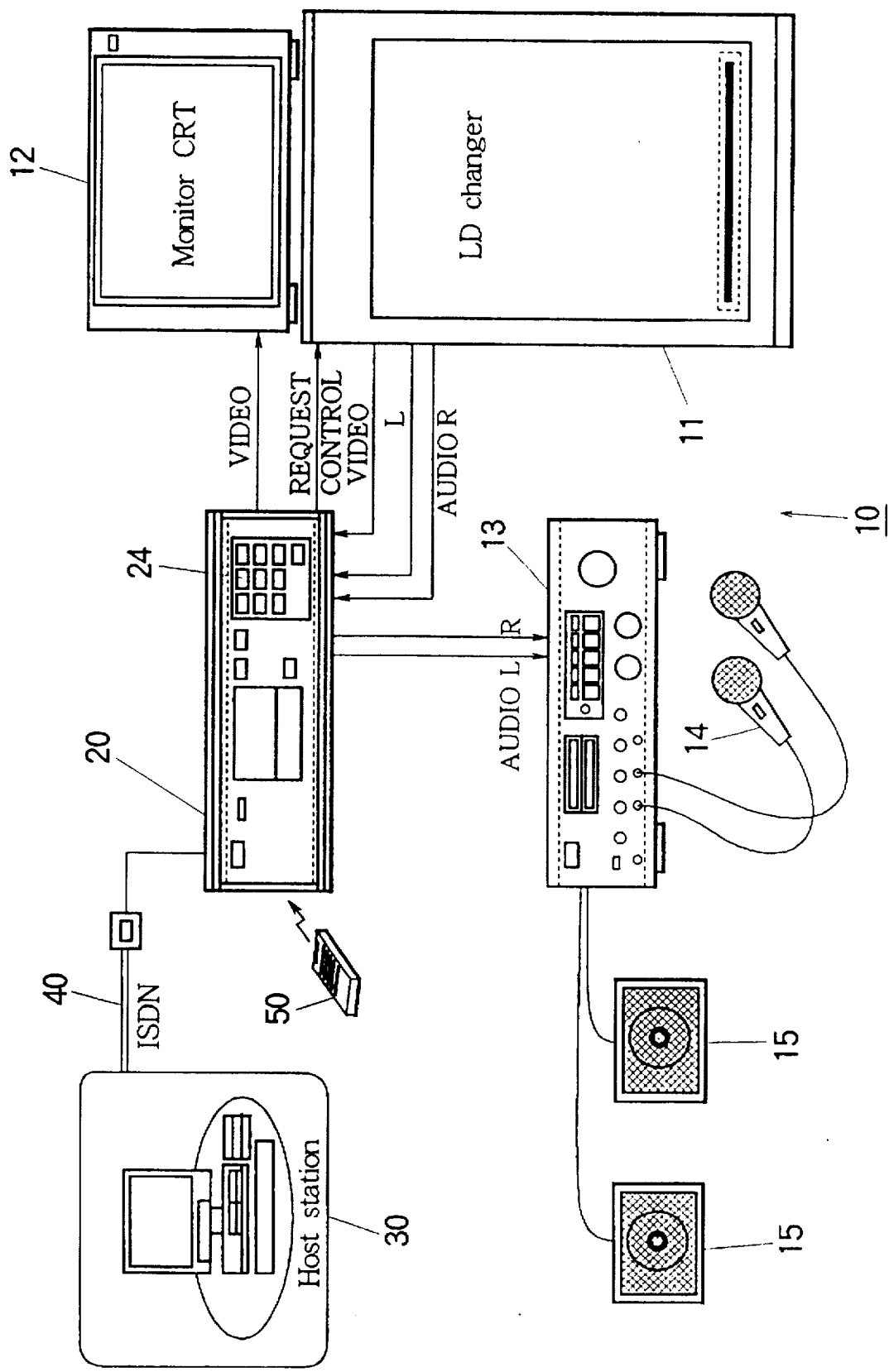
FIG. 1 is an overall system diagram showing all inventive karaoke system.

Hereinafter, embodiments of the invention will be described in conjunction with the drawings. FIG. 1 shows an overall construction of an online type karaoke system according to the present invention. The system includes a Laser Disc (LD) changer 11, a display in the form of a monitor CRT 12, a mixing amplifier 13, a microphone 14, and a pair of loudspeakers 15, those of which are connected altogether to constitute an offline karaoke equipment 10 of the musical tone reproducing type or the playback type. The inventive system further includes a total control device 20 which contains a tone generating processor and which is connected to those of the monitor CRT 12 and the mixing amplifier 13 to functionally constitute another karaoke equipment of the musical tone generating type or the synthetic type. This total control device 20 functions as a total system commander connected to a part of the playback type karaoke equipment 10 so as to build and control a karaoke station which is an integration of the playback karaoke and the synthetic karaoke. A remote host station 30 is connected to the total control device 20 through a fast digital communication network such as Integrated Services Digital Network (ISDN) to transmit thereto a requested song data to constitute the online karaoke system comprised of the karaoke station and the host station. A remote controller 50 is provided to input a command such as a song request into the online karaoke system.

The playback karaoke equipment 10 is a self-supporting type such that the LD changer 11 contains a great number of Laser Discs (LDs) as a closed or offline data source. The Laser Disc records a number of karaoke songs and associated words (lyrics) and background pictures. The LD changer 11 is controlled by the request command to access and select the Laser Discs to output an audio signal AUDIO representative of the requested karaoke song to the mixing amplifier 13 as well as to output a video signal VIDEO representative of the associated words and pictures. The mixing amplifier 13 mixes a live voice of a singer picked up by the microphone 14, with a karaoke accompaniment of the requested song. The loudspeaker 15 acoustically transmits the mixed sound of the voice and the accompaniment. Concurrently, the monitor CRT 12 displays the song words representative of the lyrics and the background picture associated to the requested karaoke song to assist in the vocal performance of the singer.

Figure 2:
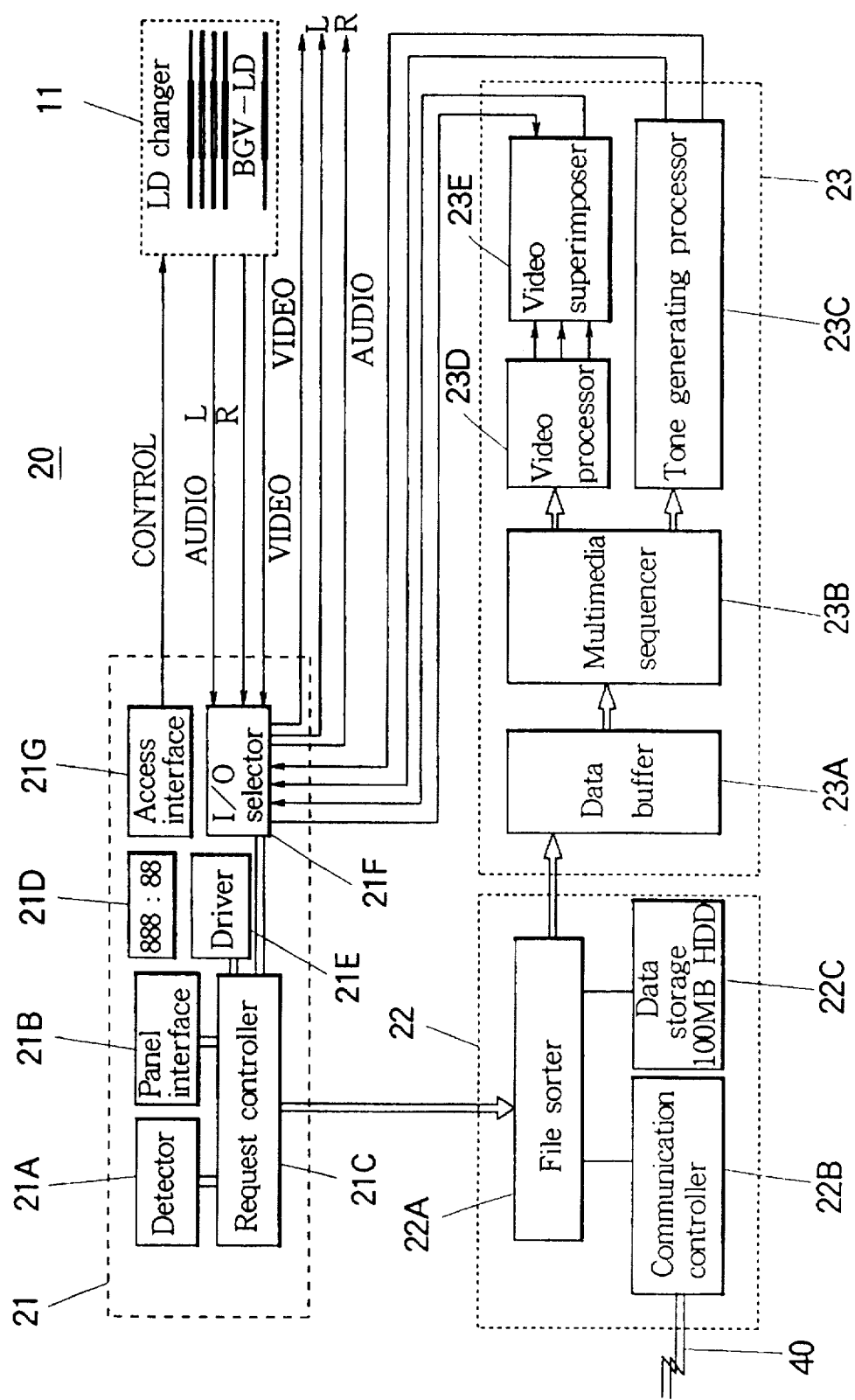
FIG. 2 is a block diagram of a total control device incorporated in the inventive karaoke system.

FIG. 2 is a block diagram showing a detailed internal construction of the total control device 20. The total control device 20 is generally divided into a command block 21 for integrally controlling the playback and synthetic karaoke equipments, a data file block 22 for stocking song data used in the synthetic karaoke, and an acoustic/graphic block 23 having various functions. First, the command block 21 is comprised of a detector 21A, a panel interface 21B, a request controller 21C, an indicator 21D, a driver 21E, an I/O selector 21F and an access interface 21G. The detector 21A detects a command from the remote controller 50. The panel interface 21B admits another command inputted from a switch panel 24 (FIG. 1) installed in the front face of the total control device 20. The request controller 21C operates in response to a command of song request from either of the detector 21A and the panel interface 21B so as to organize a plurality of song requests to effect selection and/or reservation of the requested karaoke songs. The indicator 21D is driven by the driver 21E to indicate item codes the selected or reserved songs. The I/O selector 21F selects inputs and outputs of the audio and video signals.

The data file block 22 is comprised of a file sorter 22A, a communication controller 22B and a data storage 22C. The file sorter 22A receives the selected or reserved item codes of the karaoke songs from the request controller 21C. The communication controller 22B communicates to the host station 30 through the ISDN network 40. The data storage 22C stocks the song data received from the host station through the ISDN network 40 to form a data file as an open data source. In operation, when the file sorter 22A receives the select or reserve command from the request controller 21C, the file sorter 22A initially accesses the data storage 22C to search if the song data of the requested karaoke song is stored. If stored, the searched song data is read out. On the other hand, if not stored, the communication controller 22B is activated to receive and admit a requested song data from an online database of the host station 30. The data storage 22C is comprised of, for example, a hard disc driver (HDD) having a capacity of 100 MB (megabyte) such that the HDD can stock one thousand songs provided that each karaoke song is prescribed by 10 KB (kilobyte) of song data in average.

The acoustic/graphic block 23 is comprised of a data buffer 23A, a multimedia sequencer 23B, a tone generating processor 23C, a video processor 23D and a video superimposer 23E. The data buffer 23A temporarily holds the song data supplied from the file sorter 22A. The multimedia sequencer 23B synchronously controls various events including musical tones, pictures and additional effects according to event information contained in the song data. In view of this, the song data may be referred to as "karaoke performance data" in an extended sense. The tone generating processor 23C processes the song data to synthesize the musical tone of the karaoke song under the control by the sequencer 23B. The video processor 23D generates the background picture, the characters of the song words and else. The video superimposer 23E superimposes the graphic outputs of the video processor 23D with another picture such as a background motion picture which is recorded in a background video LD (BGV-LD) loaded in the LD changer 11.

The I/O selector 21F of the command block 21 coordinates the audio part of the karaoke performance such as to select either of the playback audio output from the LD changer 11 and the synthesized audio output from the tone generating processor 23C to feed the mixing amplifier 13. Further, the I/O selector 21F coordinates the video part of the karaoke performance such as to select either of the video output reproduced from the LD changer 11 and the other video output generated from the video superimposer 23E to feed the monitor CRT 12.

Figure 3:
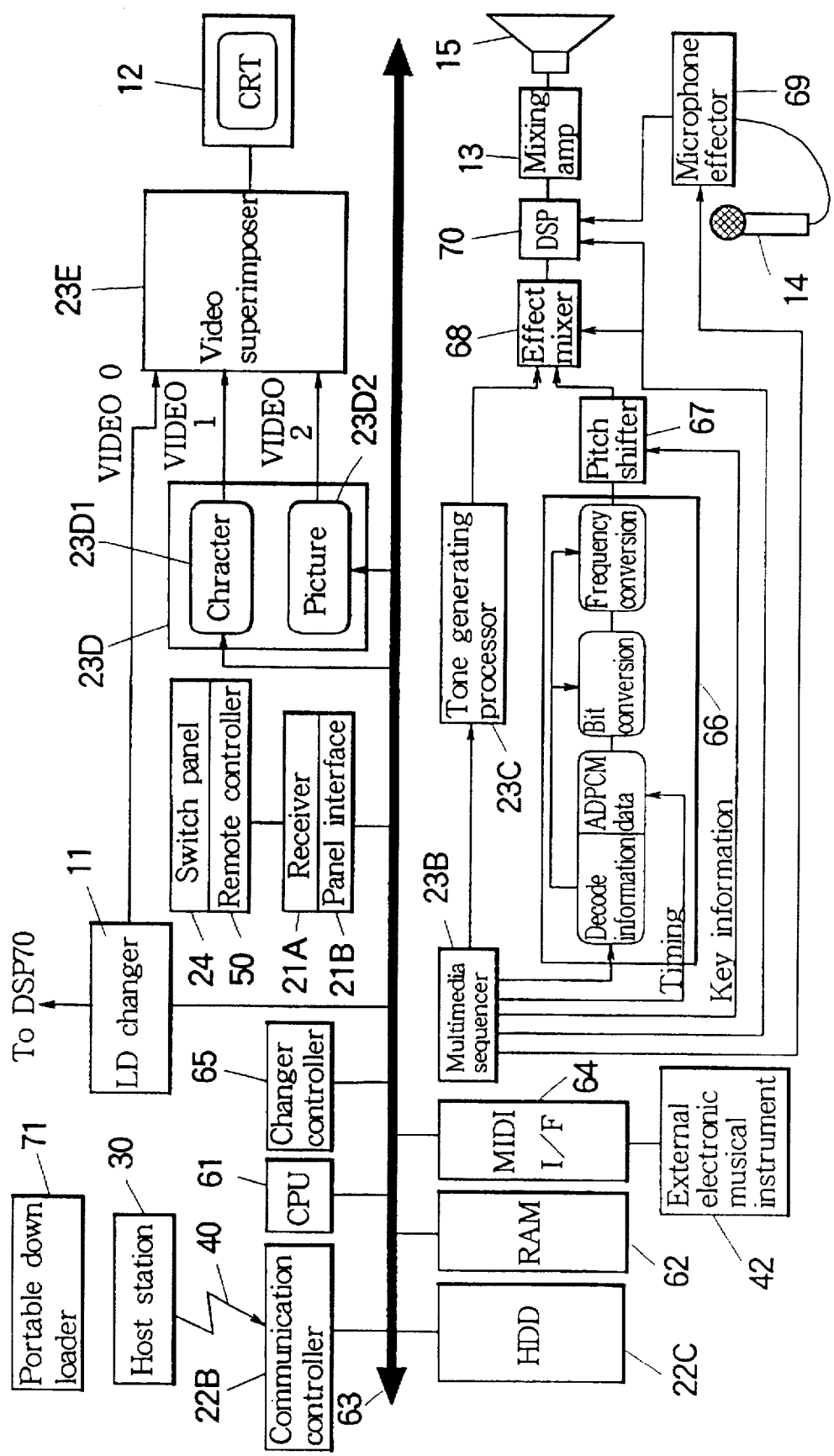
FIG. 3 is a detailed structural diagram of the FIG. 1 karaoke system.

FIG. 3 shows a detailed construction of the inventive online karaoke system. The disclosed embodiment contains additional components not explicitly illustrated in FIGS. 1 and 2. For example, a central processing unit (CPU) 61 is provided to undertake overall control of the karaoke system such as the performance data transfer according to a program ROM installed in the multimedia sequencer 23B. A random access memory (RAM) 62 provides a working area used when the CPU 61 undertakes the overall control of the karaoke system. A data and address bus line 63 connects the various components altogether to constitute the online karaoke system. A MIDI interface 64 is provided to connect to an external electronic musical instrument 42. The MIDI data contains, for example, a duration of musical notes, a length between adjacent musical notes and a tempo of a piece of music. A changer controller 65 controls the LD changer 11. The changer controller 65 can be selected according to a model type of the LD changer 11.

An ADPCM decoder 66 is provided to undertake bit-conversion and frequency-conversion to expand an adaptive delta pulse code modulation (ADPCM) data containing compacted audio signals fed from the multimedia sequencer 23B. A pitch shifter 67 is connected to the ADPCM decoder 66 for controlling the tone pitch of the decoded audio signal according to key information provided from the multimedia sequencer 23B. An effect mixer 68 receives the outputs of the pitch shifter 67 and the tone generating processor 23C. The tone generating processor 23C functions as a music synthesizer driven by a song data to synthesize an audio signal of the karaoke song. The tone generating processor 23C is comprised of a tone generating unit for synthesizing the musical tone based on the MIDI data or else and a controlling unit. A microphone effector 69 imparts a sound effect such as an echo, ac excitement and else to an output of the microphone 14. A digital sound field processor (DSP) 70 is provided to impart a sound field effect to the output of the microphone effector 69 and the audio output of the LD changer 11.

On the other hand, the video processor 23D processes character information representative of words and else associated to the performed song, and background picture information representative of still and motion pictures so as to generate a video signal for display. In this embodiment, the video processor 23D is divided into two units 23D1 and 23D2. The one video processor Unit 23D1 generates the song word characters to output a video signal VIDEO 1, and the other video processor unit 23D2 generates the background pictures to output the video signal VIDEO 2. The LD changer 11 is operated to reproduce the karaoke song recorded in the Laser Disc in the playback karaoke mode, or otherwise to reproduce image information alone for use in the synthetic 1 karaoke mode. More particularly in the synthetic karaoke mode, the LD changer 11 is operated in synchronization with the karaoke accompaniment synthesized by the tone generating processor 23C to output a video signal VIDEO 0 representative of a still picture recorded in a given frame of a given Laser Disc, or representative of a motion picture which starts from a given frame. The video superimposer 23E superimposes these video signals VIDEO 0, VIDEO 1 and VIDEO 2 with each other to form a composite picture.

Further, a down loader 71 of the portable type is utilized to load a package of the karaoke performance data into the storage (HDD) 22C without using the ISDN network 40. For example, when the online karaoke station is installed at a given user spot, a supplier brings the portable down loader 71 to the user spot to load the package of karaoke performance data at once. By such a volume loading, the user can save a long time communication with the host station 30 through the ISDN network 40, which would be needed for transfer of the great volume of the performance data.

Hereinafter, detailed description will be given to significant aspects of the operation of the inventive online karaoke system in conjunction with the drawings.

Offline/Online Control

When the remote controller 50 or the switch panel 24 is actuated to designate a karaoke song to be performed, the CPU 61 refers to an index table stored in the data storage 22C to check as to if the designated song is recorded in the LDs of the auto-changer 11 which is given the first priority. If recorded, the designated song is reproduced from the LD in the offline mode. The audio-changer 11 outputs the audio signal which is transmitted to the loudspeaker 15 through the DSP 70, and concurrently outputs the video signal VIDEO 0 which is transmitted to the monitor CRT 12 through a selector section of the video superimposer 23E. On the other hand, the live voice of the singer is converted by the microphone 14 into an electric signal which is fed to the DSP 70 through the microphone effector 64. The mixing amplifier 13 mixes the accompaniment part and the vocal part with each other so that the loudspeaker 15 produces the mixed audio output.

If the designated song is not recorded in the LD changer 11, the CPU 61 searches the song data stocked in the HDD storage 22C which is given the second priority. If the designated song is stocked in the data storage 22C, the song data is retrieved and loaded into the RIAM 62 in the offline mode. The tone generating processor 23C operates according to the song data to synthesize the musical tones to effect the karaoke performance. Such a synthesis of the musical tone is carried out under the control by the multimedia sequencer 23B. With regard to the audio part, the tone generating processor 23C successively generates the musical tone signal according to the digital song data read out from the RAM 62. The musical tone signal is acoustically reproduced by the loudspeaker 15 through the effect mixer 68, the DSP 70 and the mixing amplifier 13. With regard to the video part, the video processor units 23D1 and 23D2 produce the word characters and the background pictures, respectively, according to graphic information contained in the karaoke performance data under the control by the multimedia sequencer 23B in synchronization with progression of the song. The generated word characters and background pictures are visually displayed by the monitor CRT 12 through the video superimposer 23E. Additionally, another background picture reproduced from the LD changer 11 may be also superposed to the background picture and the word characters by the video superimposer 23E. The word characters are variably displayed by the monitor CRT 12 such that a color of the displayed words is sequentially changed in synchronization with progression of the song so as to teach the player vocal timings. Accordingly, the player can sing a song while handling the microphone 14 and following the word characters displayed on the monitor CRT 12.

If the designated song data is not stocked in the HDD storage 22C, the CPU 61 activates the communication controller 22B to take the designated karaoke performance data from the host station 30 in the online mode, which is given the third priority. Namely, the host station 30 is accessed through the ISDN network 40. When the host station 30 responds to the calling, the song item code is sent to request the designated karaoke performance data. The taken karaoke performance data is stocked in the HDD storage 22C for re-use.

Data Transfer Scheme from the Host Station

Figures 4A, 4B:
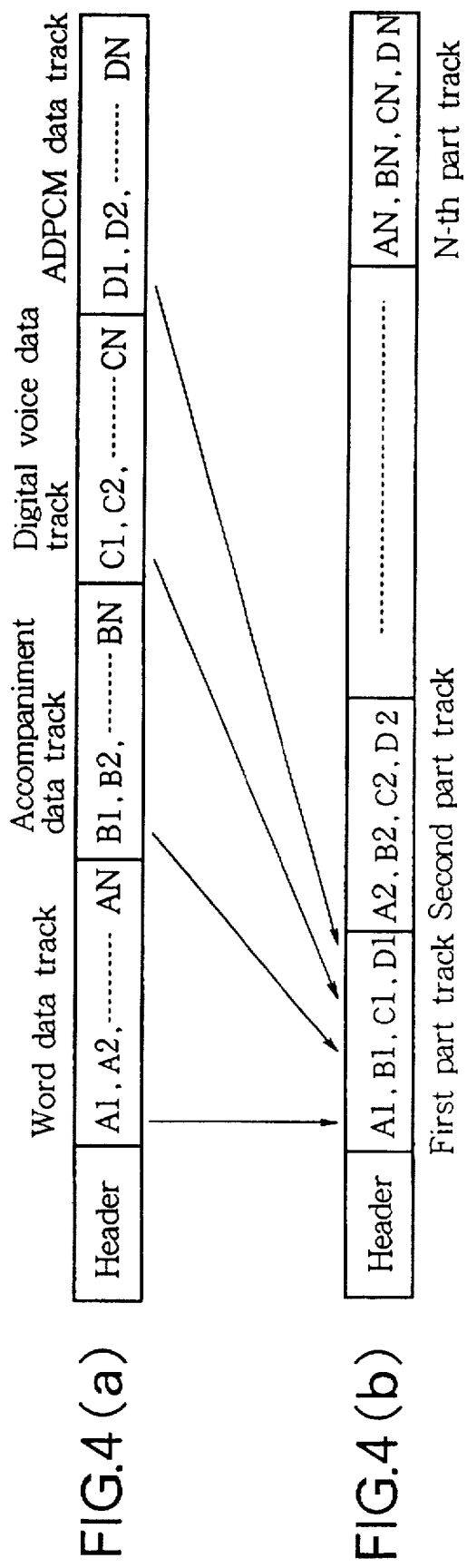
FIGS. 4(a) and 4(b) are a schematic diagram showing a song data format adopted in the inventive karaoke system.

The karaoke station is driven by the karaoke performance data which has a data format generally shown in FIG. 4(a). The performance data is comprised of a header and a subsequent serial train of a word data track, an accompaniment data track, a digital voice data track and so on. Each data track has a similar alternate arrangement of a duration and an event. The performance data is conventionally transmitted from the host station in the serial format so that the transfer of the performance data is completed when the last data track is received. Therefore, the karaoke performance is started after the last data track is received by the karaoke station. The player must wait for a considerable time interval after the request to actually start the karaoke performance. For example, the typical performance data has a length of 15 KB–20 KB for the header and 100 KB from the word data track to the voice data track. Such a length of the performance data is transferred by about 15 seconds through the fast ISDN network having a data transfer rate of 8 KB per second. Actually, this net transfer time is added by overheads such as a calling time of the host station, a database access time in the host station and else so that the total transfer time reaches more or less 20 seconds. This waiting time is ten or more times as long as the retrieval time of the performance data from the HDD, which is in the order of 1-2 seconds, thereby obviating merits of the online karaoke system.

In view of this, the data transfer format is arranged as shown in FIG. 4(b) in the inventive online karaoke system.

Namely, in the original performance data format shown in FIG. 4(a), the word data track is divided into time-sequential data sections of A1, A2, . . . , AN, the accompaniment data track is likewise divided into time-sequential data sections of B1, B2, . . . , BN, and the digital voice data track is likewise divided into time-sequential data sections of C1, C2, . . . , CN. Then, as shown in the FIG. 4(b) format, the first data sections A1, B1 and C1 coincident with each other are collected from the respective data tracks to compose a first part track. Similarly, the second data sections A2, B2 and C2 coincident with each other are collected to form a second part track. In similar manner, the N-th data sections AN, BN and CN are collected to form an N-th part track. For example, in case of N=6, the data transfer of the first part track having the length of about 15 KB is completed by about 2 seconds. The preceding data transfer of the header requires about 2 seconds, hence only 4 seconds are spent to receive the first part track. Even if an overhead is added, the receipt of the first part track may be finished by about 8 seconds. Upon receipt of the first part track, the karaoke station obtains a top part of all the performance information including the song word data, the accompaniment data, the digital voice data and else to thereby readily commence the top part of the karaoke performance involving all the concurrent events. In estimation, the karaoke performance data representative of a music piece of 3 minutes length is divided into the first part track through the sixth part track such that the karaoke station can commence about 30 seconds of the karaoke performance according to the first part track of the performance data. Accordingly, the karaoke station commences the karaoke performance after the first part track is received, while the second and further part tracks are continuously entered. After the performance of the preceding part track is finished, the succeeding part track is performed while the remaining part tracks are continuously admitted. By such a mainliner of flying start, the karaoke station immediately initiates the karaoke performance to finish the same without interruption, while the performance data is transferred in parallel to the sounding of the karaoke performance.

These of the song word data track, the accompaniment data track and the digital voice data track have a relatively small data volume likewise the MIDI data. Occasionally, the performance data may be added with a relatively great volume of data representative of, for example, a back chorus. In such a case, data compaction technology is adopted to reduce the data volume. In the FIG. 4(a) format, the performance data contains the last additional data track which carries an Adaptive Delta Pulse Code Modulation (ADPCM) data. The ADPCM data is compacted in the four-bit form by the re-sampling rate of 11 Kbps or 22 Kbps relative to the original data having the sixteen-bit form sampled by the rate of 44 Kbps. Even though compacted, the ADPCM track may have a data length up to several hundreds IKB, which needs a quite long transfer time. In view of this, as shown in the FIG. 4(b) transfer format, the ADPCM data track is also divided into time-sequential data sections of D1, D2, . . . , DN, and the respective data sections are distributed separately to the first, second, . . . , N-th part tracks for the quick data transfer. By such a manner, the karaoke song accompanied by the back chorus can be promptly initiated in the flying start mode.

Down Loading of Karaoke Performance Data into HDD Storage

Figure 5:
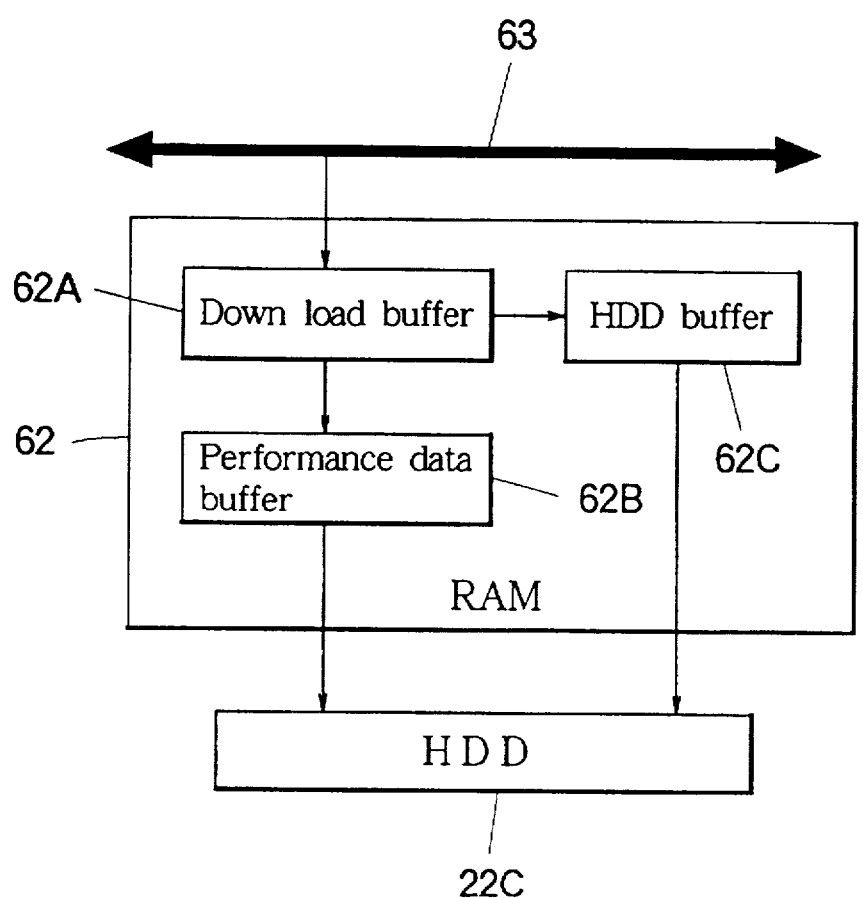
FIG. 5 is a functional block diagram of various data buffers.

There are various methods of down loading the performance data transmitted through the ISDN network into the HDD storage 22C. In one method, the received performance data is directly loaded into the HDD storage 22C. However, the HDD storage is used as a cache, hence only the frequently requested karaoke songs should be stocked in the HDD storage. In view of this, the present embodiment adopts an efficient method of preventing unwanted or rarely requested songs from the stocking. Namely, referring to FIG. 5, buffers 62A, 62B and 62C are set in the RAM 62. Firstly, the down load buffer 62A temporarily latches the performance data admitted from the ISDN network by CPU 61. Then, the latched performance data is written into the performance data buffer 62B to effect the karaoke performance. After starting the performance, the player soon judges if the performed song is just the requested song. Occasionally, the singer orders canceling of the performed song which is different from the requested song. In such an occasion, the canceled performance data is erased without stocking into the HDD storage 22C, because the canceled song is an inadvertently designated one, and may be a rarely requested one. On the other hand, if the performed song is not canceled within a certain time interval (for example, 30 seconds) after the start of the performance, it is judged that the performed song is exactly the requested one. In such a case, the latched performance data is transferred from the down load buffer 62A to the HDD buffer 62C, and then stocked in the HDD storage 22C.

Arrangement of the Karaoke Performance Data

In contrast to the FIG. 4(a) format where each song is assigned with one set of data tracks, a format of FIG. 6 provides plural sets of data tracks for one song such that the user can freely arrange the data tracks. For example, the karaoke performance data includes three word data tracks, i.e., the word data track 1 containing regular Japanese words, the word data track 2 containing a foreign language version thereof, and the word data track 3 containing parody words. In similar manner, the accompaniment data tracks 1, 2, . . . , N and the picture data tracks 1, 2, . . . contain different variation components of accompaniments and pictures, respectively. Further, the header of the karaoke performance data contains an arrangement table which lists various combinations of the data tracks, each combination being identified simply by an arrangement code. In the illustrated example, the arrange No. 1 represents the regular version composed of the word data track 1, the accompaniment data track 1 (practically containing multiple subtracks) and the picture data track 1. The arrange No. 2 represents the foreign version, and the arrange No. 3 represents the parody version. As compared to the simple format in which a separate performance data is set for a different version, such a complex format can efficiently save the total data volume since some of the data tracks can be commonly used for different versions, thereby contributing to reduction in the communication time and the memory capacity. Further, since a plurality of the data tracks are associated with one another in the same song, the data maintenance can be facilitated advantageously. In spite of such a complex data format, the user does not need to recognize detail of different versions. Namely, the Japanese language version arid the foreign language version of the same song are indicated by different song item codes in a list book of the karaoke songs, hence the user simply designates a desired item code to thereby automatically select a corresponding arrangement.

What is claimed is:

1. A karaoke system of an online type comprising:
a karaoke station for sounding a karaoke performance according to data representative of a performance; and
a host station for supplying the performance data to the karaoke station in response to a request, wherein the host station includes a transmitter for time-sequentially dividing the performance data of one song containing at least accompaniment data and lyric data into a plurality of sequential parts, each of the plurality of parts containing at least a section of accompaniment data and a section of lyric data corresponding in time with each other, and for successively transmitting each sequential part arranged according to progression of the karaoke performance in response to the request, wherein the host station is remotely located from the karaoke station, and wherein the host station transmits the performance data over a telecommunication network to the karaoke station, and the karaoke station includes a sequencer for commencing the karaoke performance upon receipt of a preceding one of the transmitted sequential parts based on the received preceding part prior to receipt of all of the plurality of parts at the karaoke station, the preceding part containing the corresponding sections of accompaniment data and lyric data which are required to begin the karaoke performance, the karaoke station receiving a succeeding one of the transmitted sequential parts in parallel to sounding of the karaoke performance to thereby maintain continuous progression of the sounding of the karaoke performance.

2. A karaoke system according to claim 1, wherein the host station includes a memory for storing a database of the performance data composed of a plurality of data tracks corresponding to different kinds of events, such as accompaniment data and lyric data, involved in the karaoke performance, each data track containing a train of time-sequentially arranged data sections, and the transmitter including means for collecting coincident ones of the data sections from the respective data tracks to form each divided part of the performance data.

3. A karaoke system according to claim 1, the karaoke system further comprising means for canceling the performance data when a received preceding part indicates an inadvertent request of the performance data.

4. A method for an online communication of data representative of a karaoke performance from a host station to a karaoke station in response to a request for sounding a karaoke performance according to the performance data, the karaoke station including a sequencer, the host station being remotely located from the karaoke station, the method comprising the steps of:

time-sequentially dividing the performance data of one song containing at least accompaniment data and lyric data stored in the host station into a plurality of parts, each of the plurality of parts containing at least a section of accompaniment data and a section of lyric data corresponding in time with each other;

successively transmitting each part arranged according to a progression of the karaoke performance from the host station to the karaoke station via a telecommunication network in response to the request from the karaoke station;

commencing the karaoke performance at the sequencer upon receipt of a preceding one of the transmitted parts at the karaoke station prior to the receipt of all of the plurality of parts, the preceding part including sections of accompaniment data and lyric data which are required to begin the karaoke performance; and admitting a succeeding one of the transmitted parts by the karaoke station in parallel to sounding of the preceding part in order to continue the sounding of the karaoke performance.

* * * * *